(12) United States Patent
Kikuchi et al.

(10) Patent No.: US 7,576,829 B2
(45) Date of Patent: Aug. 18, 2009

(54) LIQUID CRYSTAL DISPLAY DEVICE

(75) Inventors: Hirotsugu Kikuchi, Fukuoka (JP);
Tisato Kajiyama, Fukuoka (JP);
Toshihiko Nagamura, Fukuoka (JP);
Yoshiaki Hisakado, Minami-Ashigara (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/593,170

(22) PCT Filed: Mar. 15, 2005

(86) PCT No.: PCT/JP2005/004481

§ 371 (c)(1),
(2), (4) Date: Feb. 7, 2008

(87) PCT Pub. No.: WO2005/090526

PCT Pub. Date: Sep. 29, 2005

(65) Prior Publication Data

US 2008/0259254 A1    Oct. 23, 2008

(30) Foreign Application Priority Data

Mar. 19, 2004 (JP) .............................. 2004-079563
Jun. 30, 2004 (JP) .............................. 2004-192448

(51) Int. Cl.
*C09K 19/02* (2006.01)

(52) U.S. Cl. ..................................................... 349/175
(58) Field of Classification Search .................. 349/175
See application file for complete search history.

(56) References Cited

U.S. PATENT DOCUMENTS

2005/0151912 A1* 7/2005 Miyachi et al. ............. 349/141
2006/0170846 A1* 8/2006 Ozawa ....................... 349/114

* cited by examiner

*Primary Examiner*—David Nelms
*Assistant Examiner*—Phu Vu
(74) *Attorney, Agent, or Firm*—Gary C Cohn PLLC

(57) ABSTRACT

Presents a liquid crystal display device that does not require a surface orientation treatment, dramatically improves the response rate of dynamic image displays and does not experience light leaks when the display is black, which means to yield a dark field of vision. The liquid crystal display device comprises polymer-stabilized blue phase liquid crystals sandwiched between a pair of clear substrates. The liquid crystal display device obtained using polymer-stabilized blue phase liquid crystals exhibits large double refraction changes when an electrical field is applied in an in-plane direction to the cell substrates. The polymer-stabilized blue phases liquid crystals comprises a low molecular weight liquid crystal that allows a blue phase to appear between cholesteric and isotropic phases and polymer network formed in the low molecular weight liquid crystals. Furthermore, a liquid crystal display device that does not leak light when the display is black (yields a dark field of vision) can be obtained by optimizing the type and amount of a chiral dopant added to the liquid crystals.

11 Claims, 5 Drawing Sheets

Chiral dopant ZLI-4572

M=650.93 g·mol$^{-1}$    K 406.2 I

Chiral dopant CB15

M=249.35 g·mol$^{-1}$    K 277.0 Ch (247.0) I

Figure 1

Chiral dopant ZLI-4572

M=650.93 g·mol⁻¹    K 406.2 I

Chiral dopant CB15

M=249.35 g·mol⁻¹    K 277.0 Ch (247.0) I

L-Glucitol, 1,4:3,6-dianhydro- (9CI)

(b)

Glucitol, 1,4:3,6-dianhydro-, DL- (8CI)

(c)

D-Iditol, 1,4:3,6-dianhydro- (9CI)

(d)

Mannitol, 1,4:3,6-dianhydro- (6CI,7CI,8CI,9CI)

(e)

L-Iditol, 1,4:3,6-dianhydro- (9CI)

(f)

Iditol, 1,4:3,6-dianhydro- (6CI,7CI,8CI,9CI)

(g)

D-Glucitol, 1,4:3,6-dianhydro- (9CI)

(h)

D-Mannitol, 1,4:3,6-dianhydro- (9CI)

LIQUID CRYSTAL DISPLAY DEVICE

FIELD OF THE INVENTION

The present invention relates to a liquid crystal display device using polymer-stabilized blue phase liquid crystals in an in-plane switching (IPS) mode.

PRIOR ART

Liquid crystal display devices are widely used in the optical data processing field. The conventional liquid display modes include TN, STN, IPS, VA (MVA), OCB and the like. All of these modes cause the liquid crystal molecular orientation already under control to change into a different state of orientation when electrical fields are applied and change the polarization direction and polarization state of the transmitted light. The changes are converted into light and dark contrasts in polarized boards and the like to generally form a display.

These conventional liquid crystal display modes all require a surface orientation treatment in order to control the liquid crystal molecular orientation. A rubbing treatment is needed with the particular exception of VA (MVA). The rubbing treatment is an operation in which a cloth or the like is used to rub an orientation membrane that has been surface coated onto a substrate surface and is in contact with liquid crystals, and is the cause of increased costs associated with declining yields and poorer display qualities. In addition, all of the modes described above use nematic liquid crystals, and their response times are about ten milliseconds at the shortest, thus limiting their application in dynamic picture displays used for television.

Chiral nematic liquid crystals were recently developed as liquid crystals for use in liquid crystal display devices (References 1 and 2). The inventors developed a polymer-stabilized blue phase liquid crystal to be used in place of the conventional nematic liquid crystals in order to solve the problems described above (Reference 3). These polymer-stabilized blue phase liquid crystals are novel materials having a tremendously expanded operational temperature range without losing the high speed responsiveness inherent in the blue phase. A polymer-stabilized blue phase is optically isotropic when no electrical field is applied, and the orientation does not need to be controlled. A display is realized using a novel mode involving no double refraction in the absence of an electrical field and a phenomenon that induces double refraction under applied electrical fields. The response time is about one hundred microseconds and is much faster than that of conventional liquid crystal display devices.

Simultaneously, an in-place switching (IPS) mode was developed in response to the demand for larger liquid crystal screens and better quality displays (References 4 and 5). An electrical field is applied on an equilibrium surface in a substrate in this mode, and a liquid crystal material compatible with this mode is being sought.

Reference 1: Japanese Patent Application Public Disclosure (Kokai) No. 2003-295225

Reference 2: Japanese Patent Application Public Disclosure (Kokai) No. 2001-316346

Reference 3: Japanese Patent Application Public Disclosure (Kokai) No. 2003-327966

Reference 4: Japanese Patent Application Public Disclosure (Kokai) No. 09-269497

Reference 5: Appl. Phys. Lett. 67(26), 395-3897 (1995)

Problems to be Solved by the Invention

The present invention is a liquid crystal display device that deals with an in-place switching (IPS) mode and presents a liquid crystal display device that does not require a surface orientation treatment and can dramatically improve the response rate that, in conventional liquid crystal displays, is inadequate for use in dynamic picture displays. In addition, when a polymer-stabilized blue phase liquid crystal (BP) is used as an LCD element, the selective reflection in the visible light wavelength zone caused by the BP structure is the reason for light leakage when the display is black. Therefore, the present invention provides a liquid crystal display device that has no light leakage from a black screen, which means to yield a dark screen.

Means to Solve the Problems

The inventors discovered that a liquid crystal display device using polymer-stabilized blue phase liquid crystals (Reference 2) displayed a sizeable double refraction change when an electrical field was applied in the direction in-plane to a cell substrate and has a high potential to be used as display devices. Furthermore, the inventors discovered that a liquid crystal display device with no light leakage in a black display could be obtained by optimizing the type and amount of the chiral dopant added to the liquid crystals. The present invention was completed based on the discoveries.

The liquid crystal display device of the present invention is suitable for creating larger and better quality liquid crystal screens used in an in-place switching (IPS) mode. In addition, no surface orientation treatment used for orientation control is necessary since polymer-stabilized blue phase liquid crystals are used. Therefore, the orientation treatment-washing-drying process such as coating-drying-heat curing-rubbing and the like of an oriented film on a substrate surface that used to be essential in conventional display devices can be completely eliminated. In addition, foreign material contamination caused by dust, fine particles and the like associated with the process described above, static electricity generation and declines in yield and quality caused by scratching can be avoided by this process. The response time of the conventional liquid crystal display devices was basically limited since the basic theory focused on the changes in the orientation state of nematic liquid crystals, and the dynamic picture display function of such elements was worse than that of plasma panels and EL, the competing technologies. However, a polymer-stabilized blue phase solved this problem since a response time in the order of about one hundred microseconds was possible.

In addition, by optimizing the type and amount of the chiral dopant added to liquid crystals, the diffraction wavelength of the liquid crystals can be controlled to the zone outside the visible light zone (from 380 nm to 750 nm). As a result, the liquid crystal display devices using such polymer-stabilized blue phase liquid crystals can avoid light leakage during black displays, which means to yield a dark visual field.

That is, the present invention is a liquid crystal display device comprising a polymer-stabilized blue phase liquid crystal sandwiched between a pair of clear substrates, wherein the polymer-stabilized blue phase liquid crystal comprises a low molecular weight liquid crystal that allows a blue phase to appear between a cholesteric phase and an isotropic phase and a polymer network formed in the low molecular weight liquid crystal, and an electrical field is applied parallel to the substrates. This electrical field is preferably applied using two toothed comb shaped electrodes incorporated alternately in one of the clear substrate surfaces. Actually, one of the two electrodes is used as the source electrode for a thin film transistor (TFT) and the other is used as the common electrode. In practice, the TFT can act to turn the electrical field on and off. That is, it is preferable that a TFT and a common electrode are incorporated in one of the substrate surfaces and the electrical field is applied between the TFT electrode and the common electrode in a form of an electrical field responding to the on-off input signals of the TFT.

Furthermore, the polymer-stabilized blue phase liquid crystal contains a chiral dopant in this liquid crystal display device. The amount of chiral dopant in the polymer-stabilized blue phase liquid crystal is preferably adjusted so that the diffraction wavelength of the polymer-stabilized blue phase liquid crystal is outside the visible zone (from 380 nm to 750 nm).

In addition, the present invention is a polymer-stabilized blue phase liquid crystal, which is constructed from a blue phase of a composite liquid crystal composition comprising a low molecular weight liquid crystal and a polymer network, wherein the low molecular weight liquid crystal allows a blue phase to appear between a cholesteric phase and an isotropic phase and a polymer network is formed by polymerizing non-liquid crystalline monomers along with a crosslinking agent, wherein the polymer-stabilized blue phase liquid crystal contains a chiral dopant and the amount of the chiral dopant per the amount of the polymer-stabilized blue phase liquid crystal is adjusted so that the diffraction wavelength of the polymer-stabilized blue phase liquid crystal is outside visible zone (from 380 nm to 750 nm).

DETAILED DESCRIPTION OF THE INVENTION

The optical modulation element of the present invention comprises polymer-stabilized blue phase liquid crystals sandwiched between a pair of clear substrates.

Glass, plastic films, optical crystals and the like may be used as clear substrates.

The distance between a pair of these substrates is ordinarily from 2 μm to 100 μm.

The electrical field applied is ordinarily from 1,000 V/cm to 100,000 V/cm. The electrical field may be basically parallel to the substrates (or perpendicular to the display direction).

The method used to apply the electrical field is not particularly restricted, but a structure that incorporates two toothed, comb-shaped type electrodes alternately into one of the substrate surfaces is convenient. The preferred number of teeth per this toothed, comb-shaped electrode is from about two to one hundred, the preferred length is from about 1 μm to 10,000 μm, the preferred width is from about 1 μm to 50 μm and the preferred distance between comb teeth is from about 1 μm to 100 μm.

Figure 3:
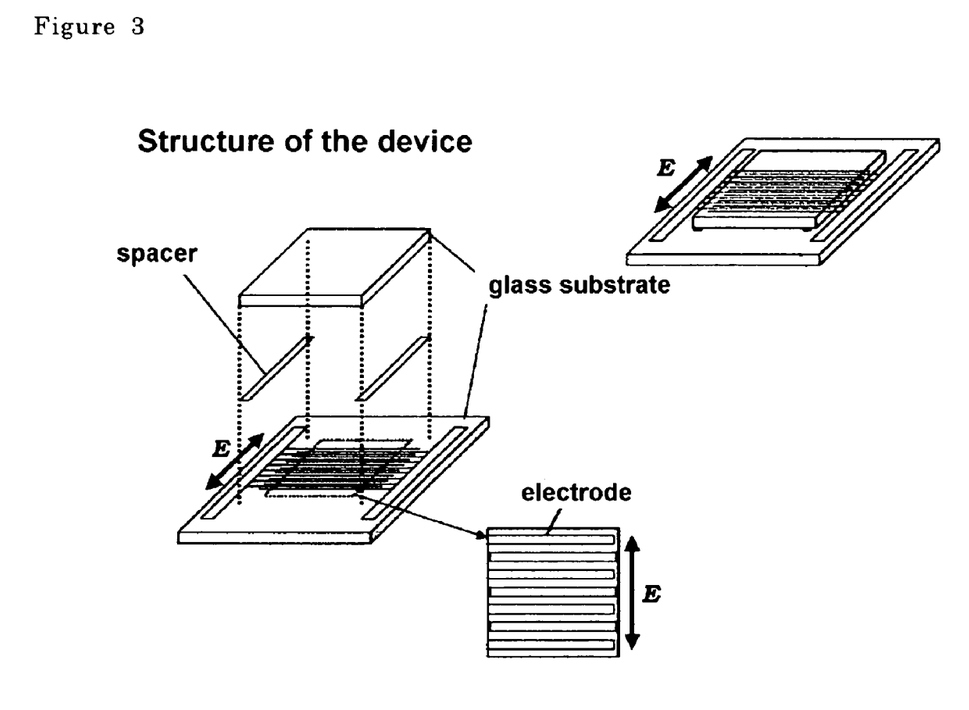
FIG. 3 is an example of the structure of an optical modulation device of the present invention.

One example of the structure of the optical modulator device of the present invention is shown in FIG. 3.

In this structure, two toothed, comb-shaped electrodes are incorporated alternately in a single plane of a substrate, and an electrical field is applied perpendicularly to the comb teeth or parallel to the substrate surface upon applying a voltage. The other substrate forming the sandwich using a spacer such as a thin film and the like is a glass sheet containing no electrodes. A gap with the thickness of the spacer used is formed between substrates, and a liquid crystal material is injected into the gap.

When a voltage is applied to two toothed, comb-shaped electrodes facing each other, a monoaxial refractive index anisotropy is generated with the optical axis in the direction of the electrical field, that is, in the direction perpendicular to the line of the toothed, comb-shaped electrodes. A cell is first positioned between two polarizing sheets, and the polarization light axis of the individual polarizing light sheets is intersected (in a so-called cross Nicol state). When the direction of the electrical field is adjusted to forty-five degrees to each of the polarizing light axes, the transmittance ratio is zero (the double refraction becomes zero) at zero electrical field, and light transmission occurs as the electrical field is applied (the cell where double refraction occurred acts like a wavelength board). Therefore, a light-dark contrast can be created when the voltage is turned ON and OFF. Maximum transmittance is reached when the cell retardation (=double refraction×cell thickness) equals half the transmitted light wavelength.

The polymer-stabilized blue phase liquid crystal of the present invention comprises a low molecular weight liquid crystal and a polymer network.

The monomer used to form the polymer network may be either a non-liquid crystalline monomer or a liquid crystalline monomer. However, a non-liquid crystalline monomer is more effective than a liquid crystalline monomer.

The non-liquid crystalline monomer is a monomer that can undergo polymerization through photo polymerization or thermal polymerization and indicates a monomer that does not have a rod shaped molecular structure (for example, molecular structures with alkyl groups, cyano groups, fluorine and the like attached to termini such as biphenyl groups or biphenyl-cyclohexyl groups and the like). For example, monomers containing polymerizable groups such as acryloyl groups, methacryloyl groups, vinyl groups, epoxy groups, fumarate groups, cinnamoyl groups and the like may be cited. But the non-liquid crystalline monomer is not restricted to these examples.

As the monomers other than non-liquid crystalline monomers, liquid crystalline monomers containing phenyl groups, cyclohexyl groups and the like and having rod shaped or sheet shaped skeletons exhibiting liquid crystallinity themselves or upon mixing with other molecules may be cited.

In addition, monomers containing multiple numbers of polymerization groups may also be used.

As preferred examples of the non-liquid crystalline monomer, acrylate type monomers containing acryloyl groups or methacryloyl groups in the molecular structure may be cited. Acrylate type monomers containing branched structure containing alkyl groups as side chains are particularly preferred. The alkyl groups are commonly alkyl groups containing from one to four carbon atoms, and monomers containing at least one side chain comprising such alkyl groups per monomer unit are used. As ideal examples of the acrylate type monomer, cyclohexyl acrylate and the like may be cited. In addition, as ideal examples of the acrylate type monomer containing alkyl groups as side chains, 2-ethylhexyl acrylate, 3,3-trimethylhexyl acrylate and the like may be cited.

A polymer network is formed upon subjecting this monomer to polymerization along with a crosslinking agent. This crosslinking agent may be either a liquid crystalline or non-liquid crystalline compound, and those containing a reactive segment that can form and yield a network structure by linking between monomer molecules corresponding to the monomer used should be used. For example, a liquid crystalline diacrylate monomer may be used as a crosslinking agent when an acrylate type monomer is used as the monomer according to the preferred embodiment of the present invention.

Simultaneously, the low molecular weight liquid crystal is able to allow a blue phase to appear between a cholesteric phase (a chiral nematic phase) and an isotropic phase. Thermotropic liquid crystals comprising thin, rod shaped, geometrically shaped molecules are preferred, but various liquid crystal materials developed for use in liquid crystal display devices may also be used. This type of low molecular weight liquid crystals contains molecular structures such as biphenyl, terphenyl, biphenyl-cyclohexyl and the like. They are substances that may themselves exhibit chirality in the presence of asymmetric atoms or substances able to allow a cholesteric phase (chiral nematic phase) to appear upon adding a chiral like substance (chiral dopant). The substance is selected from those having a spiral pitch length in the cholesteric phase (chiral nematic phase) of about 500 nm or less. These low molecular weight liquid crystals are generally preferably used as mixtures of multiple numbers of them.

Figure 1:
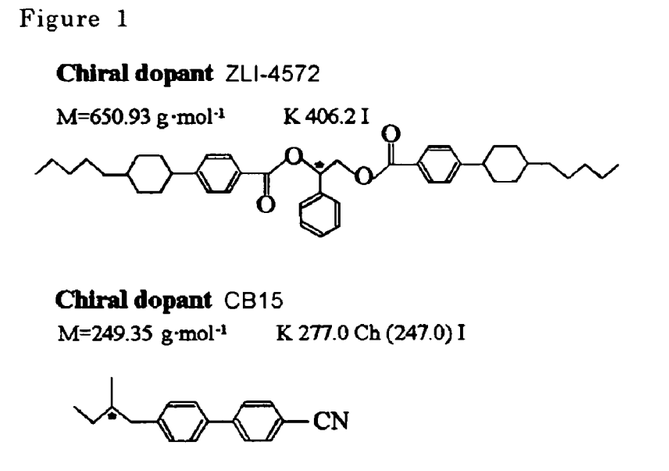
FIG. 1 is the chemical structures of ZLI-4572 and CB15 used as chiral dopants.
Figure 2:
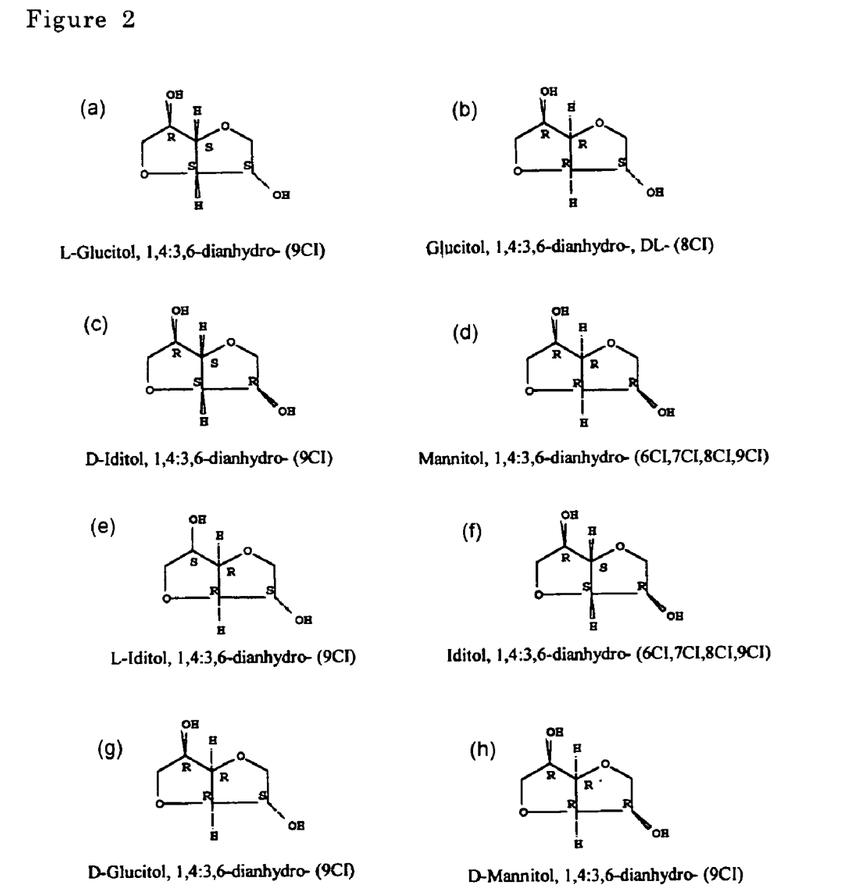
FIG. 2 is the chemical structure of a derivative containing a furo[3,2-b]furan that is a chiral dopant.

A chiral dopant is a material that creates twisting structures in a liquid crystal. For example, ZLI-4527 and CB15 (FIG. 1) used in the examples and the derivatives containing a furo[3,2-b]furan structure (see FIGS. 2a through h) and the like may be cited.

A chiral dopant is ordinarily added as an additive to stabilize the twisting structures in a TN mode and to induce a helical phase such as cholesteric phases, chiral smectic phases and the like. In the case of the present invention, a pitch length that is shorter than usual is preferred. Therefore, a chiral dopant with a large HTP and that is very soluble in the liquid crystal is preferred.

The blue phase of the polymer-stabilized blue phase liquid crystal is obtained by dispersing a monomer and a crosslinking agent in a low molecular weight liquid phase and allowing a polymerization reaction to occur at a temperature that maintains the blue phase.

The polymerization can be allowed to occur using either thermal polymerization or photo polymerization. In the case of thermal polymerization, the temperature is limited to the temperature range in which a blue phase is maintained and the polymerization temperature (heating temperature) overlaps. In addition, photo polymerization using ultraviolet light is preferred since a potential for a polymer network to undergo changes upon heating exists. In addition, a polymerization initiator in addition to a monomer, a chiral dopant and a crosslinking agent is preferably dispersed in a low molecular weight liquid crystal for the polymerization in order to hasten the polymerization rate. As the photo polymerization initiator, various initiators such as acetophenone type, benzophenone type, benzoin ether type, thioxanthone type initiators and the like may be used. More specifically, 2,2-dimethoxy-2-phenyl acetophenone and the like may be listed as examples.

The following procedure, for example, may be conducted to adjust the amount of a chiral dopant used per the amount of polymer-stabilized blue phase liquid crystals in order to adjust the diffraction wavelength of the polymer-stabilized blue phase liquid crystals in a range outside the visible zone (from 380 nm to 750 nm).

(1) Prepare a polymer-stabilized blue phase liquid crystal to which a suitable amount of a chiral dopant has been added.

(2) The diffraction wavelength of this liquid crystal surface is measured according to an ordinary method using a diffraction grating spectrophotometer (for example, a MSV-350 micro ultraviolet visible photometer manufactured by Nihon Bunko K.K.).

(3) The amount of chiral dopant needed to locate this diffraction wavelength outside the visible zone is decided.

The chiral dopant amount measured in the manner described above depends upon the HTP (helical twisting power) of the chiral dopant and varies according to the type of chiral dopant and the liquid crystal. For example, when the liquid crystal is JC1041-XX and the chiral dopant is ZLI-4572, the amount of ZLI-4572 is about from 6% by mole to 10% by mole. Similarly, when the chiral dopant is CB15, the amount of CB15 is about from 85% by mole to 95% by mole.

The present invention is exemplified and proven below using examples, but the intention is not to restrict the present invention.

EXAMPLE 1

JC1041-XX (Chisso), a fluorinated liquid crystal blend used as the liquid crystal, 4-cyano-4'-pentylbiphenyl (5CB) (Aldrich) and ZLI-4572 (Merck) used as a chiral agent were mixed and heated. The individual proportions were 47.2/47.2/5.6 (% by mole) as shown in the table below. Monofunctional 2-ethylhexyl acrylate (EHA) (Aldrich) and difunctional RM257 (Merck) photo polymerizable monomers were added to the mixed solution to form a polymer network in the mixed solution. The monomer composition ratio was EHA/RM257=70/30 (% by mole). Furthermore, 2,2-dimethoxyphenylacetophenone (DMPAP) (Aldrich) was added as the photo polymerization initiator to obtain a uniform solution. The monomer concentration in the mixed solution was referred to as $\alpha$, and the $\alpha$ was varied from 4 mole % to 15 mole %. The DMPAP was prepared so that it was present at 5% by mole based on the monomer mixture.

TABLE 1

| Sample | Monomer | | Photoinitiator | Liquid Crystal | | |
|---|---|---|---|---|---|---|
| | EHA | RM257 | DMPAP | JC1041-XX | 5CB | ZLI-4572 |
| Molar ratio/mol % Composite | 70 | 30 | | 47.2 | 47.2 | 5.6 |
| | α mol % | | 0.05 · α mol % | (100 − 1.05 · α) mol % | | |

A sandwich type glass cell was prepared using a glass substrate (E.H.C. Co., Ltd.) 1.1 mm thick with a toothed, comb-shaped type ITO electrode (ITO electrode resistance value: 100Ω) with the distance between electrodes of 50 μm on a substrate surface and a glass substrate 1.1 mm thick with no electrodes. The cell thickness was set at 25 μm using a spacer.

The mixed solution described above in an isotropic phase was poured into the glass cell using a capillary phenomenon. The liquid phase that appeared using the mixed solution prepared was, from the high temperature side, BPII, BPI and chiral nematic phase. The glass cell temperature was maintained at a constant level in the temperature zone in which the composite system displayed BPI. By irradiating using ultraviolet light at an irradiation intensity of 1.5 mW cm$^{-2}$ (365 nm), a polymer-stabilized blue phase was prepared.

The ultraviolet light irradiation procedure involved 1 s/five times, 2 s/twice, 3 s·5 s 15 s·30 s·30 min/once, and the irradiation spacing was 10 s. The liquid crystal phase was identified using a polarized light microscope. The polarized light microscope used was an ECLIPSE E600W (Nikon Co., Ltd.), and the observation was conducted under a crossed Nicol state.

Figure 4:
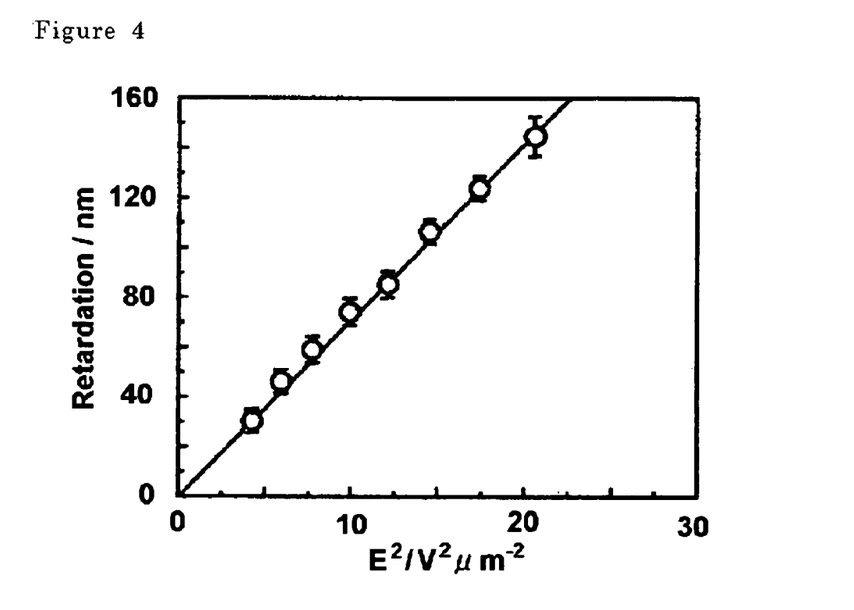
FIG. 4 is a figure showing the effect of an electrical field on optical retardation.

The effect of an electrical field on the optical retardation (=double refraction×cell thickness) of the blue phase in a polymer-stabilized blue phase liquid crystal (α=6.3 mole %) is shown in FIG. 4. The coordinate shows the degree of 632 nm light transmittance in the direction perpendicular to the substrate face at 293K. The magnitude of optical retardation induced by the electrical field increased in proportion to the square of the electrical field as did the Kerr effect. The Kerr effect indicates one type electrical field induced double refraction, and the double refraction, Δn=(Kerr coefficient)×(wavelength)×(square of electrical field). The Kerr coefficient was calculated from the slope in FIG. 4 and was 3.7× 10$^{-10}$ V$^{-2}$ m and was about 180 times the Kerr coefficient of nitrobenzene. For an optically isotropic material, this was an unusually high value. The light transmittance reached a maximum when the optical retardation was one half of the wavelength of the light. A high voltage was ordinarily needed to make the optical retardation one half the wavelength of the transmitted light in this type of system. However, this type of condition was easily achieved when a liquid crystal with a high refractive index and a large induced anisotropy such as the polymer-stabilized blue phase liquid crystal in a liquid crystal display device of the present invention was used.

Figure 5:
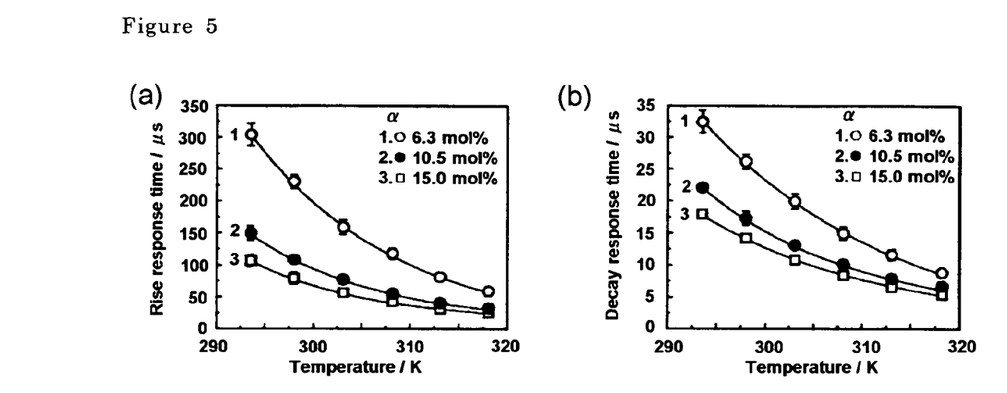
FIG. 5 is a figure showing the effect of temperature on the response time.

The effect of temperature on the response time is shown in FIG. 5 where (a) is the inflection time and (b) is the attenuation time. The response time was calculated by fitting the changes in transmittance at the instant a voltage was applied and at the instant the voltage was removed into a relaxation function. The monomer concentration in the sample solution (a) was from 6.3 mole % to 15.0 mole %. The distribution factor for the response time was from 0.4 to 0.6. The response time along with the inflection time and the attenuation time was faster when a was larger. The inflection time at 293.5° K was 105 μs, and the attenuation time was 18 μs. This attenuation time was comparable to that of a low molecular weight blue phase at 325.5° K. In addition, the attenuation time in the high temperature zone was about 10$^{-6}$ s. This type of response time is extremely high [fast, short?] when compared to the response times of conventional liquid crystal display devices.

Figure 6:
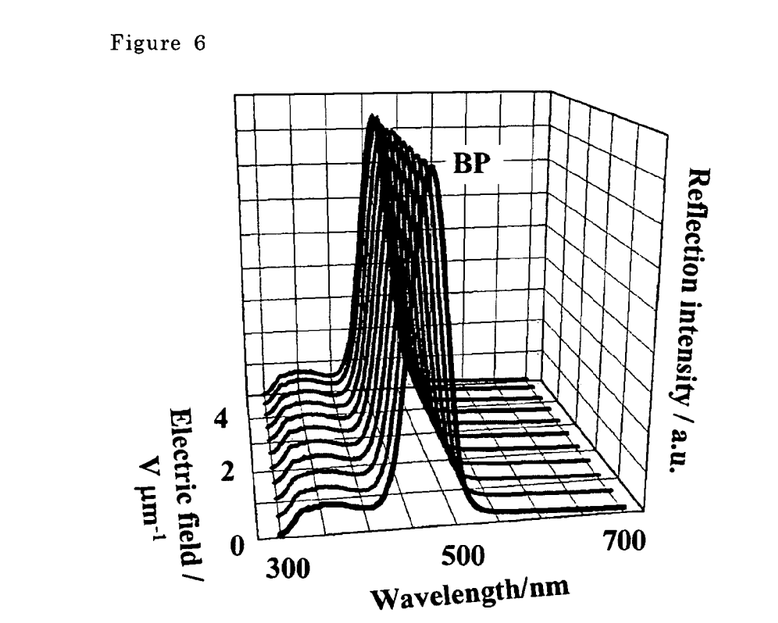
FIG. 6 is a figure showing a reflection spectrum of a polymer-stabilized BP ($\alpha$=6.5 mole %) in the presence of an electrical field (Example 1). The (110) diffraction peak of the BP grating was observed in the vicinity of 480 nm.

A reflection spectrum in the presence of an electrical field for a polymer-stabilized BP prepared using a photo polymerizable monomer fraction (α) of 6.5 mole % is shown in FIG. 6. The measurement was conducted at 298° K. The (110) diffraction peak of a BP grate observed in the vicinity of 489 nm was remarkable even after an electrical field was applied.

EXAMPLE 2

In order to control the diffraction wavelength of the BP that appeared to 380 nm or lower, a chiral agent CB15 (Aldrich) was introduced into a mixed liquid crystal (JC1041-XX/5CB/ZLI-4572). The composition of each (photo polymerizable monomer/liquid crystal) composite sample prepared is shown in Table 2.

TABLE 2

| Sample | Monomer | | Photoinitiator | Liquid Crystal | | | |
|---|---|---|---|---|---|---|---|
| | EHA | RM257 | DMPAP | JC1041-XX | 5CB | ZLI-572 | CB15 |
| Molar ratio/mol % Composite | 70 | 30 | | 37.2 | 37.2 | 5.6 | 20 |
| | 6.5 mol % | | 0.33 mol % | 93.2 mol % | | | |

Figure 7:
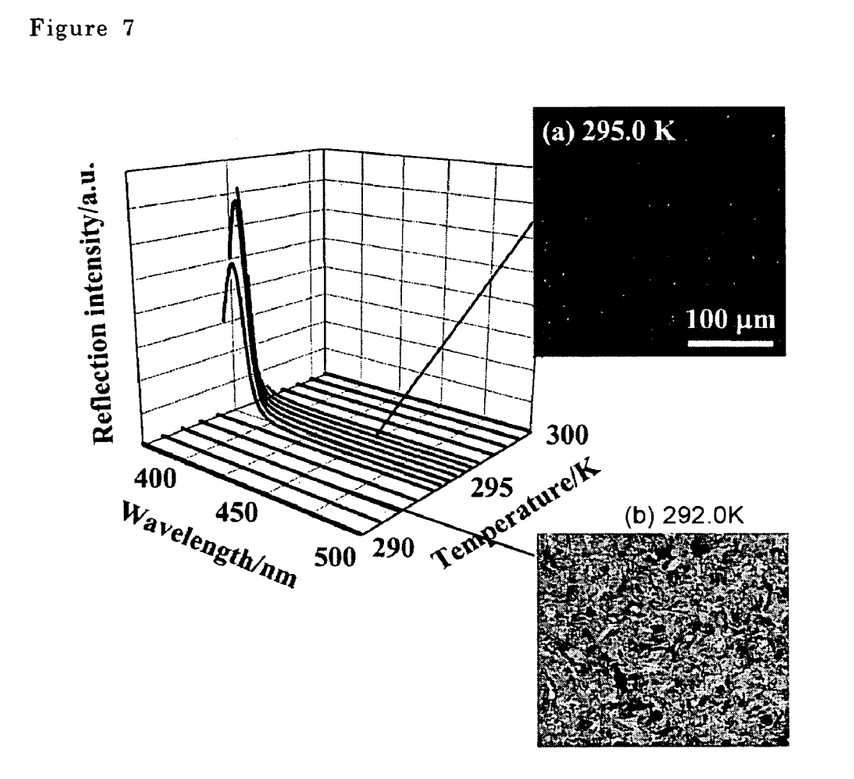
FIG. 7 is a figure showing the temperature dependence of a reflection spectrum of a (photo polymerizable monomer/liquid crystal) composite system (Example 2).

The temperature dependence of the reflection spectrum for a (photo polymerizable monomer/liquid crystal) composite system is shown in FIG. 7. In order to prevent the initiation of photo polymerizable monomer polymerization by the examination light source (365 nm), the scanned wavelength zone was from 700 nm to 375 nm. The reflection spectrum clearly indicated that the BP appearance temperature range for the composite system was about 2.5° K.

The inserted figures in FIG. 7 were polarized light microscope images at the temperatures at which (a) blue phase (BP) and (b) chiral nematic phase or cholesteric phase (N*) appeared in the composite system. The diffraction wavelength of the BP was 380 nm or lower, and the (a) was a dark field even in the area where BP appeared in the polarized light microscope images. In a similar trend also observed in a mixed liquid crystal alone in a system, a (b) focal-conic structure associated with N* was observed in a low temperature zone.

Based on the insight gained, a polymer-stabilized BP was prepared using photo polymerization. The optical structure of the BP that appeared could not be confirmed using a polarized microscope examination. Therefore, ultraviolet light irradiation was conducted from the BP/N* phase transition temperature observed to 2° K on the high temperature side. The irradiation mode used was the same as that described in Example 1.

Figure 8:
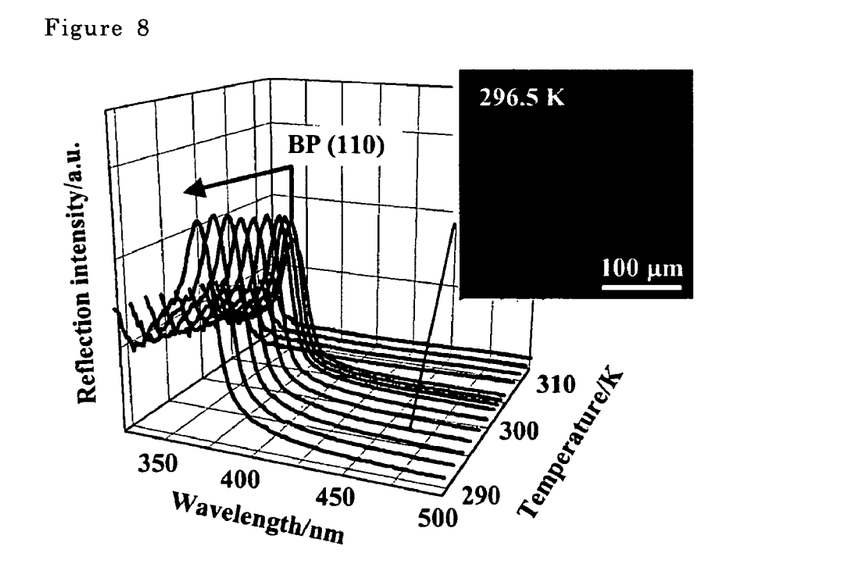
FIG. 8 is a figure showing the temperature dependence of a reflection spectrum of the (polymer network/liquid crystal) composite system prepared (Example 2).

The temperature dependence of the reflection spectrum of the (polymer network/liquid crystal) composite system prepared was shown in FIG. 8. A remarkable reflection peak indicating the appearance of BP was observed over a broad temperature range.

The diffraction wavelength observed was in the vicinity of 370 nm. Compared to FIG. 6 (diffraction wavelength 480 nm), the optimization of a chiral dopant was able to shift the diffraction wavelength to the ultraviolet region. The polarized light microscope image at 296.5° K was a dark field.

Figure 9:
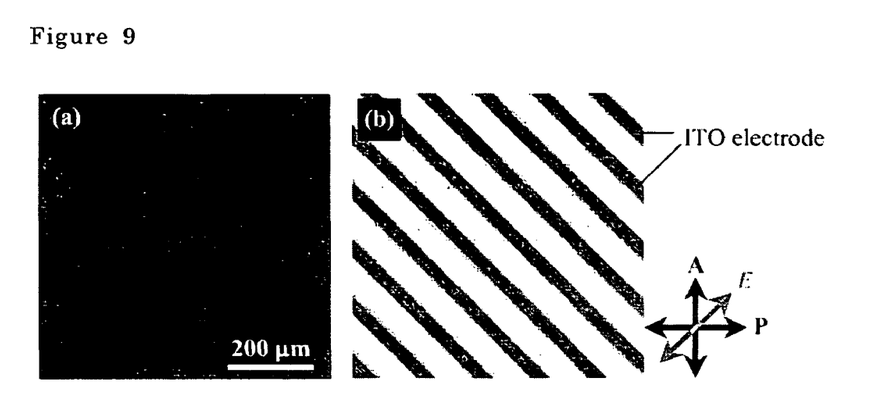
FIG. 9 is a figure showing a polarized light microscope images of a polymer-stabilized BP prepared before and after an electrical field was applied (Example 2). (a) 0 V $\mu m^{-1}$, (b) 4.9 V $\mu m^{-1}$.

The polarized light microscope images of the polymer-stabilized BP prepared before and after an electrical field was applied are shown in FIG. 9. The observation was made at 293° K. The applied electrical field was a 4.9 V $\mu m^{-1}$ sinusoidal wave alternating current electrical field at a frequency of 100 kHz. When no electrical field was applied (a), the state of polarization of the incident light did not change upon passing through an optically isotropic polymer-stabilized BP, and the polarized light microscope image was a dark field. After an electrical field was applied (b), a dramatic increase in the amount of transmitted light was observed indicating that a double refraction was induced in the polymer-stabilized BP between electrodes.

Figure 10:
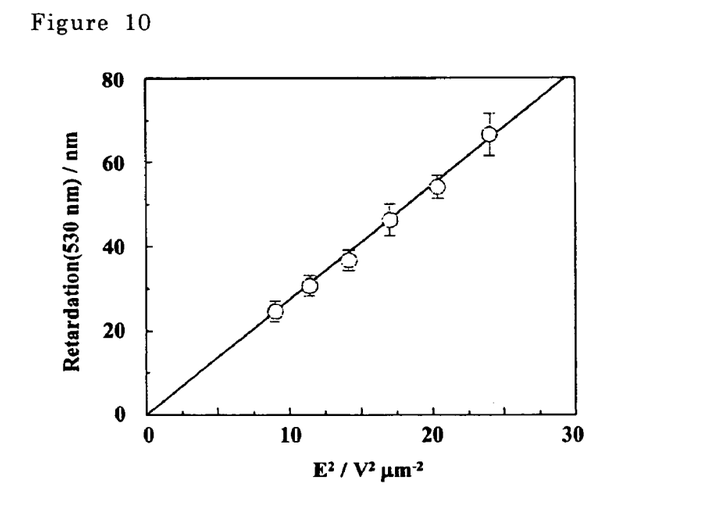
FIG. 10 is a figure obtained by plotting the retardation measured using a monochromatic light source (530 nm) against the square of the applied electrical field (Example 2).

The retardation measured using a monochromatic light source (530 nm) is plotted against the square of the applied electrical field in FIG. 10. The measurements were conducted at 293° K. Using the slope in FIG. 10, the Kerr coefficient was calculated and was found to be $2.05 \times 10^{10}$ $mV^{-2}$. This value corresponded to a sixty fold increase over that of nitrobenzene.

Figure 11:
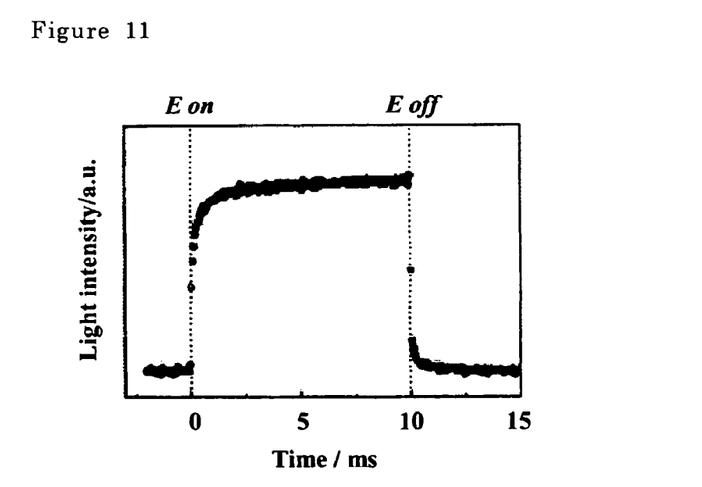
FIG. 11 is a figure showing the optical switching curve of a polymer-stabilized BP observed at 293° K (Example 2).

Next, the response time of electrical double refraction was evaluated. An optical switching curve of a polymer-stabilized BP observed at 293° K is shown in FIG. 11. The response time evaluated from the curve obtained indicated a inflection point at 147 μs ($\beta=0.43$) and an inflection point at 23 μs ($\beta=0.53$).

What is claimed is:

1. A liquid crystal display device comprising a polymer-stabilized blue phase liquid crystal sandwiched between a pair of clear substrates, wherein the polymer-stabilized blue phase liquid crystal comprises a low molecular weight liquid crystal that allows a blue phase to appear between a cholesteric phase and an isotropic phase and a polymer network formed in the low molecular weight liquid crystal, and an electrical field is applied parallel to the substrates.

2. The liquid crystal display device of claim 1, wherein the polymer-stabilized blue phase liquid crystal contains a chiral dopant and the amount of the chiral dopant per the amount of the polymer-stabilized blue phase liquid crystal is adjusted so that the diffraction wavelength of the polymer-stabilized blue phase liquid crystal is outside visible zone (from 380 nm to 750 nm).

3. The liquid crystal display device of claim 1, wherein the electrical field is applied using two toothed comb shaped electrodes incorporated alternately in one of the clear substrate surfaces.

4. The liquid crystal display device of claim 1, wherein a TFT and a common electrode are incorporated in one of the substrate surfaces and the electrical field is applied between the TFT electrode and the common electrode in a form of an electrical field responding to the on-off input signals of the TFT.

5. A polymer-stabilized blue phase liquid crystal, which is constructed from a blue phase of a composite liquid crystal composition comprising a low molecular weight liquid crystal and a polymer network, wherein the low molecular weight liquid crystal allows a blue phase to appear between a cholesteric phase and an isotropic phase and a polymer network is formed by polymerizing non-liquid crystalline monomers along with a crosslinking agent, wherein the polymer-stabilized blue phase liquid crystal contains a chiral dopant and the amount of the chiral dopant per the amount of the polymer-stabilized blue phase liquid crystal is adjusted so that the diffraction wavelength of the polymer-stabilized blue phase liquid crystal is outside visible zone (from 380 nm to 750 nm).

6. A liquid crystal display device comprising a polymer-stabilized blue phase liquid crystal of claim 5 sandwiched between a pair of clear substrates, wherein an electrical field is applied parallel to the substrates.

7. The liquid crystal display device of claim 6, wherein the electrical field is applied using two toothed comb shaped electrodes incorporated alternately in one of the clear substrate surfaces.

8. The liquid crystal display device of claim 6, wherein a TFT and a common electrode are incorporated in one of the substrate surfaces and the electrical field is applied between the TFT electrode and the common electrode in a form of an electrical field responding to the on-off input signals of the TFT.

9. The liquid crystal display device of claim 7, wherein a TFT and a common electrode are incorporated in one of the substrate surfaces and the electrical field is applied between the TFT electrode and the common electrode in a form of an electrical field responding to the on-off input signals of the TFT.

10. The liquid crystal display device of claim 2, wherein the electrical field is applied using two toothed comb shaped electrodes incorporated alternately in one of the clear substrate surfaces.

11. The liquid crystal display device of claim 2, wherein a TFT and a common electrode are incorporated in one of the substrate surfaces and the electrical field is applied between the TFT electrode and the common electrode in a form of an electrical field responding to the on-off input signals of the TFT.

* * * * *